United States Patent Office 3,657,171
Patented Apr. 18, 1972

3,657,171
HOT MELT COATING COMPOSITION
Dorothy E. White, Wilmington, Del., assignor to Hercules Incorporated, Wilmington, Del.
No Drawing. Filed Oct. 8, 1969, Ser. No. 864,877
Int. Cl. C09j 3/26
U.S. Cl. 260—27
6 Claims

ABSTRACT OF THE DISCLOSURE

Disclosed are hot melt compositions comprised of a hydrocarbon wax, an ethylene/vinyl acetate copolymer, and a metal salt of a carboxylic acid such as sodium benzoate.

---

This invention relates to novel hot melt coating compositions.

Hot melt coating compositions comprised of an ethylene/vinyl acetate copolymer and a wax are known in the art. These compositions are applied, by known hot melt coating techniques, as coatings on paper, paper board, and similar substrates to impart barrier properties thereto, such as grease resistance and resistance to the transmission of water vapor. Such coatings are applied also to impart to the substrate protective properties such as scuff resistance.

Compatible modifying resins, such as polyterpenes, are sometimes added to these hot melt compositions to modify certain properties of the coatings such as flexibility and gloss retention.

An object of this invention is a hot melt composition of the above types having improved barrier properties and particularly improved resistance to the transmission of water vapor on creasing.

Other objects of this invention will, in part, be obvious and will, in part, appear hereinafter. For a complete understanding of this invention reference is made to the following detailed description.

In accordance with this invention there is provided a hot melt coating composition comprised of, by weight, from about 10 to about 20 parts of an ethylene/vinyl acetate copolymer; from about 90 to about 80 parts of petroleum hydrocarbon wax having a melting point in excess of about 120° F.; and from about 0.02% to about 2% by weight, based on the weight of petroleum hydrocarbon wax, of a metal salt of a carboxylic acid to be detailed more fully hereinafter.

Petroleum hydrocarbon wax component can be a paraffin wax having a melting point of from about 115° F. to about 200° F., a microcrystalline wax having a melting point of from about 140° F. to about 210° F., and mixtures thereof.

The preferred hot melt coating compositions will have a wax component comprised of, by weight, from about 80% to 100% of a paraffin wax having a melting point within the range 120–180° F. and from 0% to about 20% of a microcrystalline wax having a melting point within the range 120–200° F.

Ethylene/vinyl acetate copolymer component will have, by weight, a polymerized vinyl acetate content of from about 5% to about 35% based on the weight of the copolymer. Preferred copolymers will have a polymerized vinyl acetate content of from about 26% to about 29%.

The above hot melt coating compositions can contain at least one modifying resin. The modifying resin or resins will be compatible with the other components of the compositions and will have a Ball and Ring softening point of from about 130° F. to about 300° F. and preferably from about 130° F. to about 230° F. If such a resin is included, it will be used in an amount sufficient to provide a composition comprised of, by weight, (A) from about 10 to about 20 parts of the ethylene/vinyl acetate copolymer; (B) from about 10 to about 20 parts of the modifying resin; (C) the petroleum hydrocarbon wax in an amount such that (A)+(B)+(C) equals 100 parts; and (D) from about 0.02% to about 2% by weight, based on the weight of the wax, of a metal salt of a carboxylic acid. Thus, when a modifying resin is used, it will replace from about 10 parts to about 20 parts of the wax component.

Suitable modifying resins include rosin and rosin esters that have been modified to provide good resistance to oxidation; hydrocarbon resins, particularly petroleum hydrocarbon resins; and polyterpene resins.

Examples of modified rosins include disproportionated rosin, hydrogenated rosin, and polymerized rosin. Examples of modified rosin esters include hydrogenated rosin esters such as the hydrogenated glyceryl ester of rosin.

As above set forth, another modifying resin is a hydrocarbon resin. This resin can be derived from liquid petroleum distillates boiling in the range of from about 20° C. to 280° C., and preferably in the range of about 30° C. to 140° C., or any fraction boiling within these ranges.

In place of the cracked petroleum distillates, unsaturated hydrocarbon compounds from various sources can be used. Thus, relatively pure hydrocarbon compounds such as diolefins and olefins or mixtures of these with relatively minor proportions, e.g., from about 5 to 10%, of cyclic diolefins and/or cyclic olefins, or of substituted benzene hydrocarbons such as styrene, α-methyl styrene, vinyl toluene or divinyl benzene, can be reacted together in controlled proportions to produce resins of predetermined characteristics. Various indeterminate mixtures of unsaturated hydrocarbons can also be reacted in this manner. Various proportions of these unsaturated hydrocarbons of any or all of the classes mentioned above can be mixed with certain fractions of cracked distillates to provide satisfactory materials for hydrocarbon resin formation.

The hydrocarbon resins can be prepared by causing the hydrocarbons to react in the presence of a suitable catalyst or activating agent or by the use of heat alone. The catalysts which can be used include acidic catalysts such as $AlCl_3$, $ZnCl_2$, $BF_3$, $H_2SO_4$, $H_3PO_4$ and acid clays, anionic catalysts such as metallic lithium and sodium or their alkyl derivatives, metal coordinate catalysts such as aluminum triisobutyl and $TiCl_4$ or $TiCl_3$, and free radical catalysts such as benzoyl peroxide, cumene hydroperoxide, tert-butyl hydroperoxide, and hydrogen peroxide. Temperatures utilized will vary, depending on the monomers and catalysts used and, in any event, are well known to the art. For example, for aluminum chloride with the typical olefin-diolefin polymerization, the temperature range can vary from about —40° C. to about 70° C. with from about 20° C. to about 40° C. preferred. Reaction time can vary from about 1 hour to about 8 hours, but will usually be from about 1 hour to about 2 hours. Catalyst is added in increments at a rate controlled by the ability to remove heat. After the catalyst is added, the reaction is continued as long as yield increases.

After the reaction is complete, residual catalyst is quenched by suitable methods such as addition of methyl alcohol and subsequent filtration, water and/or caustic washing. The reaction mass is then stripped of unreacted hydrocarbons and low molecular weight oils by vacuum or steam distillation.

Preferred hydrocarbon resins are the thermoplastic relatively linear type petroleum resins having a softening point between about 125° F. and about 230° F., preferably between about 150° F. and 215° F., of low or no aromatic hydrocarbon content and substantially free of cross-linking. The average molecular weight of these resins is about 1000 to 15000, and their specific gravity, measured at 25/25° C., is from about 0.96 to 0.98, and usually about 0.97. These resins have a carbon to hydrogen ratio of from about 6.0 to 7.0.

The petroleum hydrocarbon resins are made by mild Friedel-Crafts polymerization of a highly unsaturated liquid boiling in the vicinity of the naphtha boiling range, and containing mostly $C_6$ to $C_9$ hydrocarbons resulting from the steam-cracking of petroleum fractions such as naphtha, kerosene, gas oil, and the like, with about 50 to 100 mole percent of steam at temperatures of about 1000 to 1500° F. Generally, butadiene is removed, and usually also the isoprene. The resulting liquid which is available for use as polymerization feed to make the resin may have a boiling range of about 20° C. to 280° C., depending upon the boiling range of the cracking feed and conditions used for the steam cracking operation. Thus the polymerization feed may have a boiling range of from 20° C. to 170° C., or from about 30° C. to 280° C.

The distribution of the constituents within these fractions may, of course, vary somewhat, but may be illustrated as follows for a feed having an over-all range of 20 to 170° C.

| Boiling point range of fraction (° C): | Percent by weight |
|---|---|
| 20–70 | 0–60 |
| 70–130 | 40–65 |
| 130–170 | 0–35 |

In general, the over-all chemical composition of this polymerization feed is as follows.

| Composition: | Percent |
|---|---|
| Diolefins | 8–25 |
| Aromatics | 19–49 |
| Olefins | 30–68 |
| Paraffins and naphthenes | 1–5 |

The distribution of the constituents in a feed having an over-all distillation range of 20° C. to 140° C. is set forth below.

| | Percent |
|---|---|
| I.B.P. to 38 ° C. | 0–30 |
| 38–70° C. | 20–60 |
| 70–130° C. | 30–70 |
| 130° C. plus | 0–10 |
| Composition: | |
| Diolefins (conjugated) | 10–30 |
| Isoprene | 0–5.0 |
| Piperylene | 5–15 |
| Cyclodiene | 0–5 |
| Other diolefins | 1–10 |
| Aromatics | 10–65 |
| Benzene | 10–40 |
| Toluene | 1–20 |
| $C_8$ aromatics | 0–5 |
| Paraffins | 0–5 |
| Olefins | 30–80 |

Steam-cracked petroleum fractions may contain a small amount of cyclodienes such as cyclopentadiene, methylcyclopentadiene, and the like. Exclusion of such cyclodienes from the polymerization mixture can be accomplished if desired by subjecting the steam-cracked naphtha to heating to about 90–140° C. to dimerize the cyclodienes, and then carefully distilling to take $C_5$ to $C_9$ constituents overhead but to leave as residue the dimerized cyclodienes.

It should be noted that since the polymerization process used for making the resin is relatively mild, the benzene and toluene or other aromatics that do not actually enter into the reaction are subsequently removed when the resin is stripped of volatile solvent, or low boiling polymerization fractions.

The polymerization is generally carried out at about −40° C. to +70° C. with about 0.25–3.0% of a Friedel-Crafts catalyst such as $AlCl_3$, $BF_3$, $TiCl_4$, and the like, as, for instance, a temperature of 25° C. with 1% of powdered $AlCl_3$, (of about 30 mesh) as catalyst. When the polymerization is finished, the reactor contents may be washed with 5% aqueous sodium hydroxide, and several times with water, and then heated under vacuum, e.g., 5 to 50 mm. pressure absolute, to strip off volatile constituents and leave a light-colored resin. By stripping to higher temperatures and/or under higher vacuum conditions, the softening point of the resin can be raised from the vicinity of 150° F. to 212° F. or 215° F. These resins can be made by the processes disclosed and described in U.S. Pats. 2,734,046 and 2,770,613.

The terpene resins suitable for use as a modifying resin include both the alpha-pinene resins and the beta-pinene resins. Alpha- and beta-pinene resins having a molecular weight of about 1200 and a Ball and Ring softening point of about 115° C. are particularly suitable.

In one known procedure for producing terpene resins, the pinene is diluted with a refined hydrocarbon solvent, such as naphtha cut and contacted with a Friedel-Crafts catalyst. After the initial heat evolution reactions have subsided, an additional contacting period with the catalyst is provided. The catalyst is removed by successive washings with water and dilute aqueous alkali and separation of the aqueous and hydrocarbon phases. The hydrocarbon phase is then subjected to high temperature and steam distillation. The pinene resin is subsequently recovered.

The metal salt of a carboxylic acid used in this invention is preferably the sodium salt. Salts of the same acids with other metals from Group I–A and Group II–A of the Periodic Table of Elements can be used if desired.

The carboxylic acids can be broadly classified into two main groups: (a) dicarboxylic acids, and (b) monocarboxylic acids which contain ring structures, which include monocarboxylic acids having the carboxyl group attached to a ring carbon atom (sometimes referred to herein as benzoic acid type compounds), and monocarboxylic acids having the carboxyl group attached to an aliphatic carbon atom and a ring attached to another aliphatic carbon atom (sometimes referred to herein as arylalkanoic acid type compounds).

Sodium salts which are used can be represented by the general formula $Na_mX$ where $m$ is the valence of X, and X is the carboxylic acid anion, selected from the group of carboxylic acids listed below.

More broadly, salts which can be used have the formula $M_mX_n$, where M is a metal from Group I–A or II–A, X is the carboxylic acid anion, selected from the group of carboxylic acids disclosed below, and $m$ and $n$ are integers selected such that the ratio $m{:}n$ is the same as the ratio of the valence of X to the valence of M.

The group of dicarboxylic acid type compounds whose sodium salts may be used includes saturated aliphatic dicarboxylic acids, preferably having at least 4 carbon atoms per molecule, saturated cycloaliphatic dicarboxylic acids and aromatic dicarboxylic acids. Among the dicarboxylic acid salts those of acids having up to 12 carbon atoms per molecule are generally preferred. The following are illustrative.

Sodium salts of acids of 4 to 12 carbon atoms, e.g., of succinic, glutaric and adipic acid and with those of the higher acids having even numbers of carbon atoms per molecule, such as suberic, sebacic, and tetramethyladipic acid.

Sodium salts of saturated cycloaliphatic dicarboxylic acids, such as cis-1,4-cyclohexanedicarboxylic acid, 1,2-cyclohexanedicarboxylic acid and 1,1-cyclohexanedicarboxylic acid.

Sodium salts of orthophthalic acid, metaphthalic acid and tetramethylterephthalic acid.

Sodium salts of other dicarboxylic acids, e.g., of arylsubstituted aliphatic dicarboxylic acids such as paraxylyl succinic acid and 3-phenylbutanedicarboxylic acid.

The group of benzoic acid type acids includes benzoic acid itself, hexahydrobenzoic acid (cyclohexanecarboxylic acid), and substituted benzoic and hexahydrobenzoic acids. All the acids of this group have in common that they are carbocyclic monocarboxylic acids whose carboxyl group is attached to a carbocyclic nucleus, which may be aromatic or aliphatic. The group of benzoic acid type compounds further includes heterocyclic monocarboxylic acids whose carboxyl group is attached to a ring carbon atom.

Suitable substituted benzoic, hexahydrobenzoic and heterocyclic acids include those having one or more hydrocarbon groups substituted on the nucleus. Preferred are those with 1 to 6 carbon atoms per substituent group, preferably those with alkyl substituents; cycloalkyl and aryl substituents may also be present. Typical useful alkyl substituted benzoic acids are o-methylbenzoic acid, p-methylbenzoic acid, p-ethylbenzoic acid, p-isopropylbenzoic acid, p-tert-butylbenzoic acid and o-tert-butylbenzoic acid. Benzoic acids may also have the acid carrying benzene ring condensed with another benzene ring, such as in alpha naphthoic acid, or they may have a cyclohexyl ring substituted on the benzene ring, as in p-cyclohexylbenzoic acid.

Sodium salts of alicyclic compounds corresponding to the above aromatic compounds can be used. Suitable carbocyclic acids are, for example, cyclohexane carboxylic acid, 1-methylcyclohexane carboxylic acid, cis - 4 - tert-butylcyclohexane carboxylic acid, cis-4-neopentylcyclohexane carboxylic acid, trans-4-methylcyclohexane carboxylic acid and trans-4-tert-butylcyclohexane carboxylic acid. Heterocyclic acids include 2-furane carboxylic acid (pyromucic acid) and gamma-pyridine carboxylic acid (isonicotinic acid).

Also useful are sodium salts of cyclic monocarboxylic acids containing a polar group or atom substituted on the nucleus, e.g., a hydroxy-, alkoxy-, amino- or esterified carboxyl group or a halogen atom. These polar groups or atoms may occur on the nucleus either as the sole substituent or together with one or more hydrocarbon group substituents. Typical examples of this group are: m-hydroxybenzoic acid, p-hydroxybenzoic acid, o-chlorobenzoic acid, p-chlorobenzoic acid, m-nitrobenzoic acid, 3,5-dinitrobenzoic acid, o-aminobenzoic acid, p-aminobenzoic acid, p-acetamidobenzoic acid, o-formylbenzoic acid and p-methoxybenzoic acid. Less effective are salicylic acid (o - hydroxybenzoic acid), o - mercaptobenzoic acid, m-chlorobenzoic acid, p-nitrobenzoic acid, 3-methylsalicylic acid, dichlorosalicylic acid, 2,5-dichlorosalicylic acid, 2,5-dihydroxybenzoic acid and 3,5-dihydroxybenzoic acid.

The group of arylalkanoic acid type compounds whose sodium salts may be used includes as preferred groups aryl alkanoic acid salts. Particularly preferred and typical compounds are salts of monophenylacetic acid and diphenylacetic acid.

The effective arylalkanoic acid type compounds may be designated terminal aliphatic monocarboxylic acids substituted with at least one carbocyclic group per molecule. The preferred acids contain from 8 to 25 carbon atoms, including from 1 to 4 carbon atoms in the alkyl group attached to the carboxyl group. Said carbocyclic groups may be aryl, aralkyl, arylalkenyl, cycloalkalkyl or cycloalkalkenyl groups. The acids may contain as furfurther substituents aliphatic hydrocarbon groups; the acids may be substituted with hydroxyl groups, amino groups or halogen atoms.

The following compounds are illustrative of this group: Sodium salts of phenyl acetic acid, diphenyl acetic acid, beta, beta-diphenylpropionic acid and beta-phenyl-beta-methylbutyric acid.

Sodium salts of alpha-phenyl-alpha-methylpropionic acid, beta,beta,beta - triphenylpropionic acid, beta,beta, beta-tri(p - tert - butylphenyl)propionic acid, and beta-p-tolyl-beta-methylbutyric acid.

Other suitable acids of this group carry hydroxyl, amino, or halogen substitution in the aliphatic chain as in beta,beta-di(p-tert-butylphenyl)-alpha - hydroxypropionic acid and in benzilic acid (diphenylglycolic acid).

Cycloalkyl substituted alkanoic acids include, for example, cyclohexylacetic acid, beta-cyclohexylpropionic acid and beta-cyclohexylbutyric acid.

The following examples are illustrative of this invention. All parts and percentages are by weight unless otherwise specified.

EXAMPLE 1

A hot melt composiiton is prepared which is comprised of 15 parts ethylene/vinyl acetate copolymer having a combined vinyl acetate content of 28%, 15 parts of disproportionated rosin, 10 parts of microcrystalline wax having a melting point of about 153° F., 60 parts of paraffin wax having a melting point of about 151° F. The water vapor transmission rate (g./100 sq. in./24 hours) of a coating of this composition is about 3.9.

EXAMPLE 2

A hot melt composition similar to that of Example 1 is prepared with the exception that prior to use it has substantially uniformly dispersed therein sodium benzoate in an amount equal to 0.1% of the weight of the wax component. The water vapor transmission rate of a coating of this composition having the same thickness as the coating of Example 1 is about 0.4; and the creased water vapor transmission rate is about 1.4.

Hot melt compositions similar to Example 2, but which contain no modifying resin, have improved water vapor transmission properties when there is incorporated therein a metal salt of a carboxylic acid, such as sodium benzoate, as above described.

The above description and working examples are illustrative of this invention and not in limitation thereof.

What I claim and desire to protect by Letters Patent is:

1. A hot melt coating composition comprised of, by weight, (I) from about 10 parts to about 20 parts of an enthylene/vinyl acetate copolymer having a polymerized vinyl acetate content of from about 5% to about 35% by weight, (II) from about 90 parts to about 80 parts of a petroleum hydrocarbon wax component comprised of, by weight, from about 80% to 100% of a paraffin wax having a melting point in the range 120–180° F. and 0% to about 20% of a microcrystalline wax having a melting point in the range 120–200° F., and (III) from about 0.02 to about 2% by weight, based on the weight of the wax component (II) of a salt $Na_mX$ where $m$ is the valence of X, and X is the anion of a carboxylic acid selected from the group consisting of (1) cyclic monocarboxylic acids, free of olefinic unsaturation, whose carboxyl group is attached to a carbon atom of a 5- to 6-membered ring;

(2) dicarboxylic acids selected from the following group:
  (i) aromatic dicarboxylic acids having from 2 to 4 carboxyl groups per molecule and free of olefinic unsaturation,
  (ii) saturated cycloaliphatic dicarboxylic acids,
  (iii) saturated aliphatic and saturated hydrocarbon-substituted aliphatic terminal dicarboxylic acids having from 4 to 12 carbon atoms per molecule; and (3) terminal aliphatic monocarboxylic acids substituted with at least one carbocyclic group per molecule.

2. The composition of claim 1 wherein from about 10 parts to about 20 parts of the wax component (II) is replaced with an equivalent amount of a modifying resin selected from the group consisting of disproportionated rosin, hydrogenated rosin, polymerized rosin, hydrogenated rosin esters, a petroleum hydrocarbon resin and a terpene resin.

3. The composition of claim 1 wherein the sodium salt is sodium benzoate.

4. The composition of claim 2 wherein the modifying resin is disproportionated rosin.

5. The composition of claim 4 wherein the sodium salt is sodium benzoate.

6. The composition of claim 5 wherein the polymerized vinyl acetate content of the copolymer (I) is from about 26% to about 29%.

References Cited

UNITED STATES PATENTS

| | | | |
|---|---|---|---|
| 3,175,986 | 3/1965 | Apikos | 260—28 |
| 3,189,573 | 6/1965 | Oken | 260—27 |
| 3,394,097 | 7/1968 | Bissot | 260—28.5 |

OTHER REFERENCES

Kopyscinski: "Adhesives Age," 1960, pp. 31, 40, and 36 relied on.

DONALD E. CZAJA, Primary Examiner

W. E. PARKER, Assistant Examiner

U.S. Cl. X.R.

117—145, 158, 168; 260—28.5 A